(No Model.) 12 Sheets—Sheet 1.
W. COWAN.
COIN FREED GAS METER.
No. 474,219. Patented May 3, 1892.
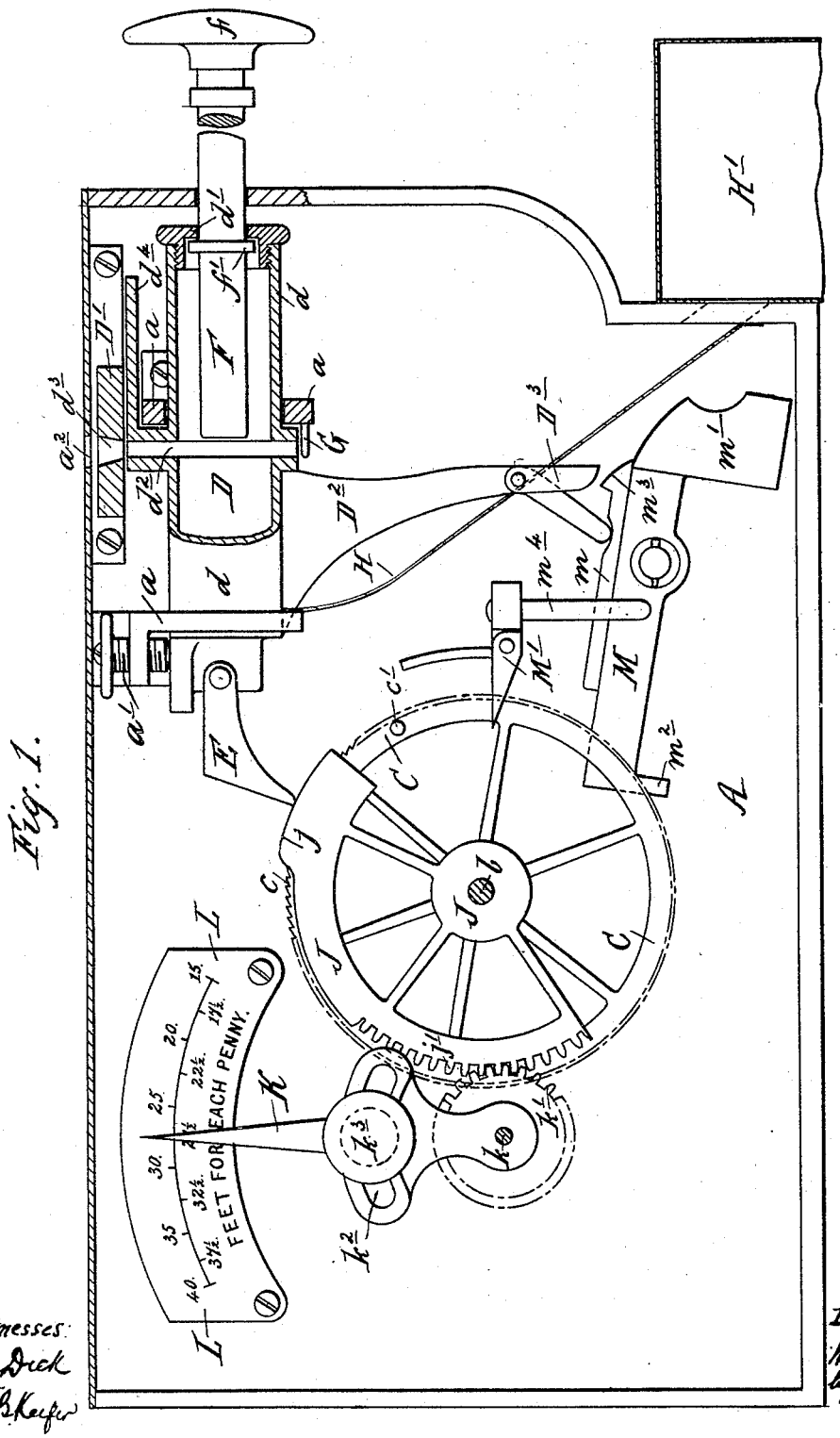
Witnesses
Ed Dick
F. B. Keifer
Inventor:
Wm Cowan
by M. Bailey
atty.

(No Model.)  12 Sheets—Sheet 2.
W. COWAN.
COIN FREED GAS METER.
No. 474,219.  Patented May 3, 1892.
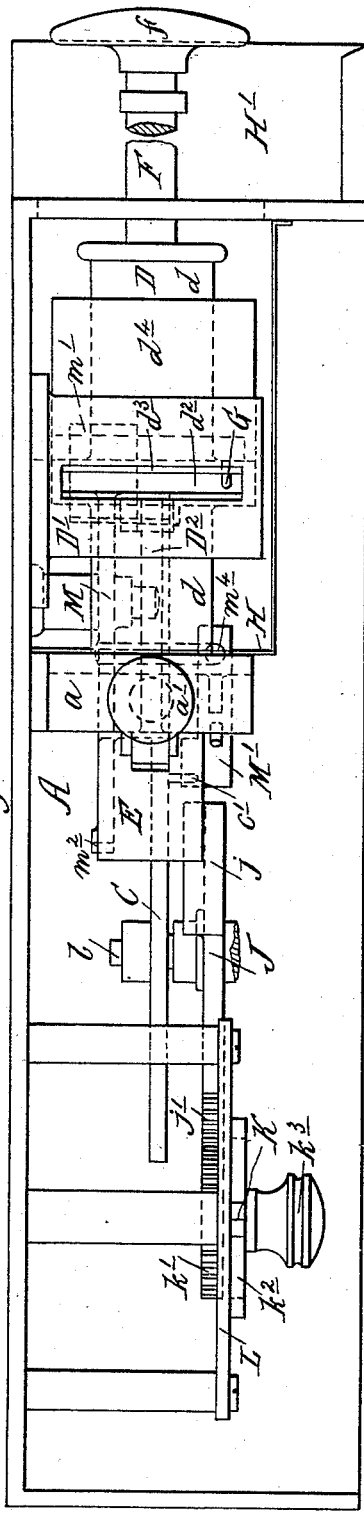
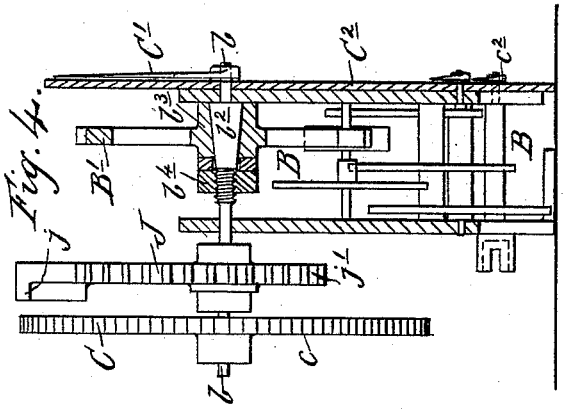
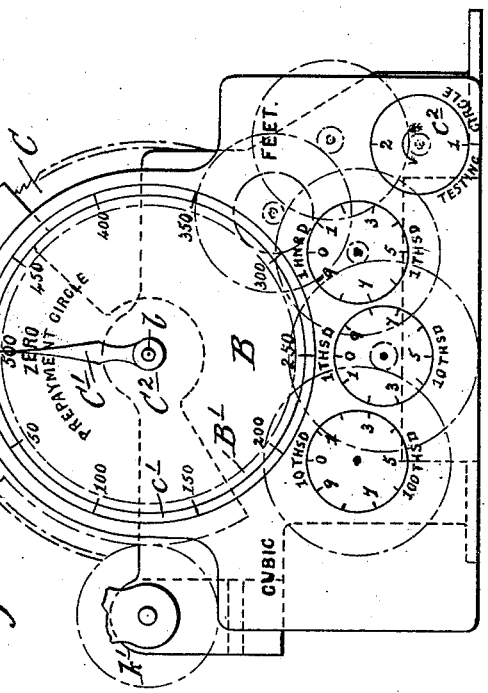
Witnesses:  Inventor:

(No Model.)  12 Sheets—Sheet 3.
W. COWAN.
COIN FREED GAS METER.
No. 474,219.  Patented May 3, 1892.
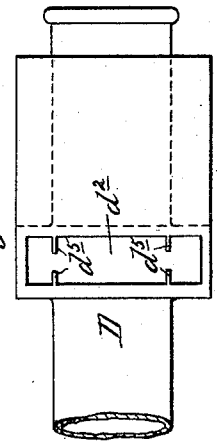
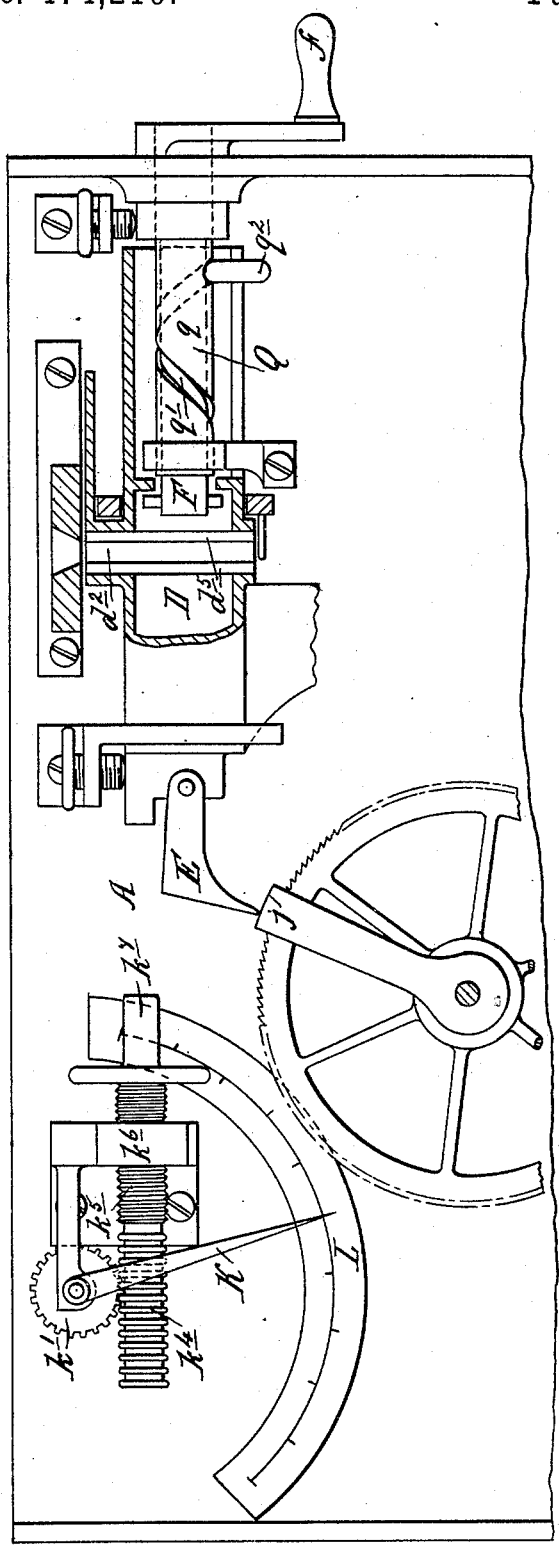
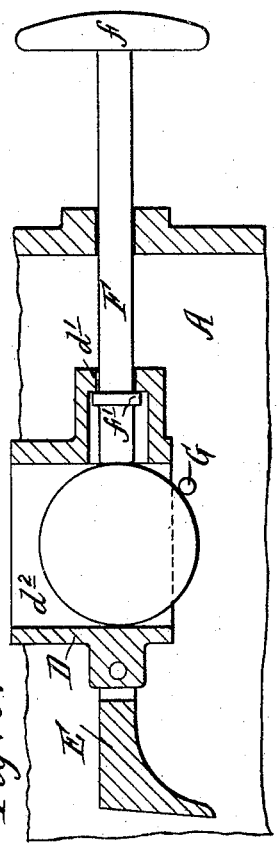

(No Model.) 12 Sheets—Sheet 4.
W. COWAN.
COIN FREED GAS METER.
No. 474,219. Patented May 3, 1892.
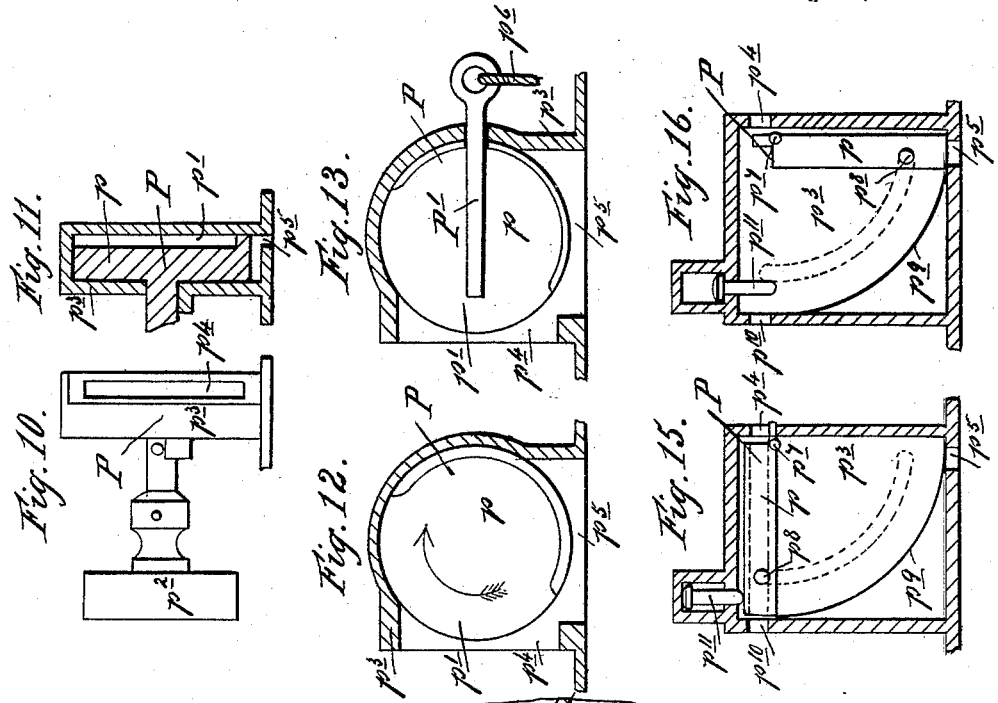
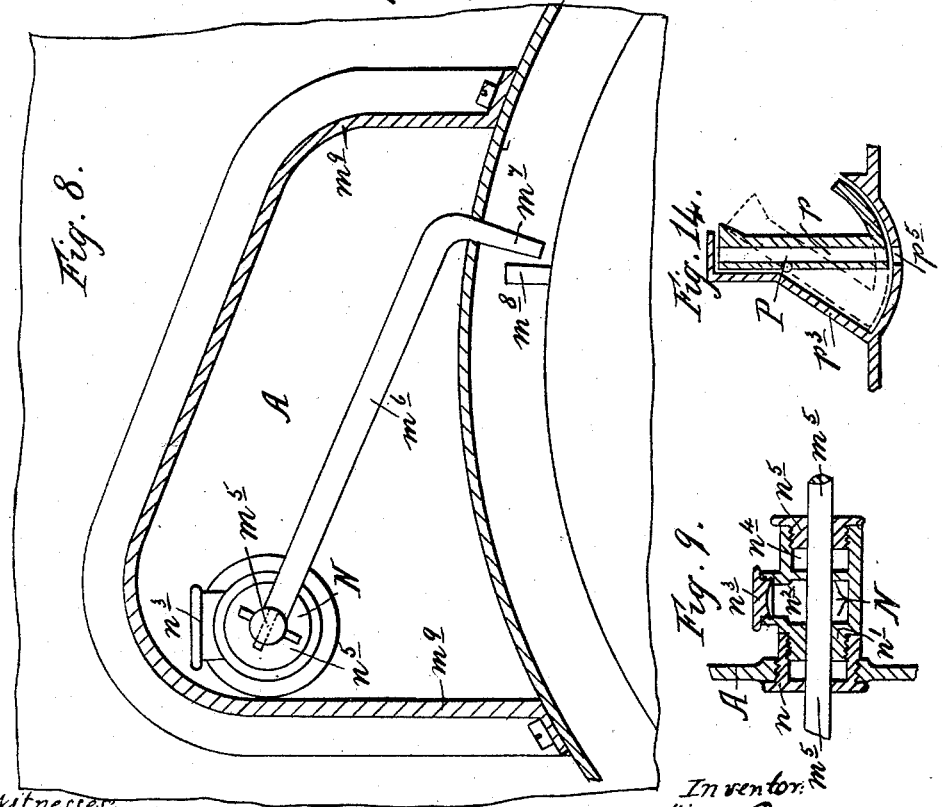

(No Model.) 12 Sheets—Sheet 5.
W. COWAN.
COIN FREED GAS METER.
No. 474,219. Patented May 3, 1892.
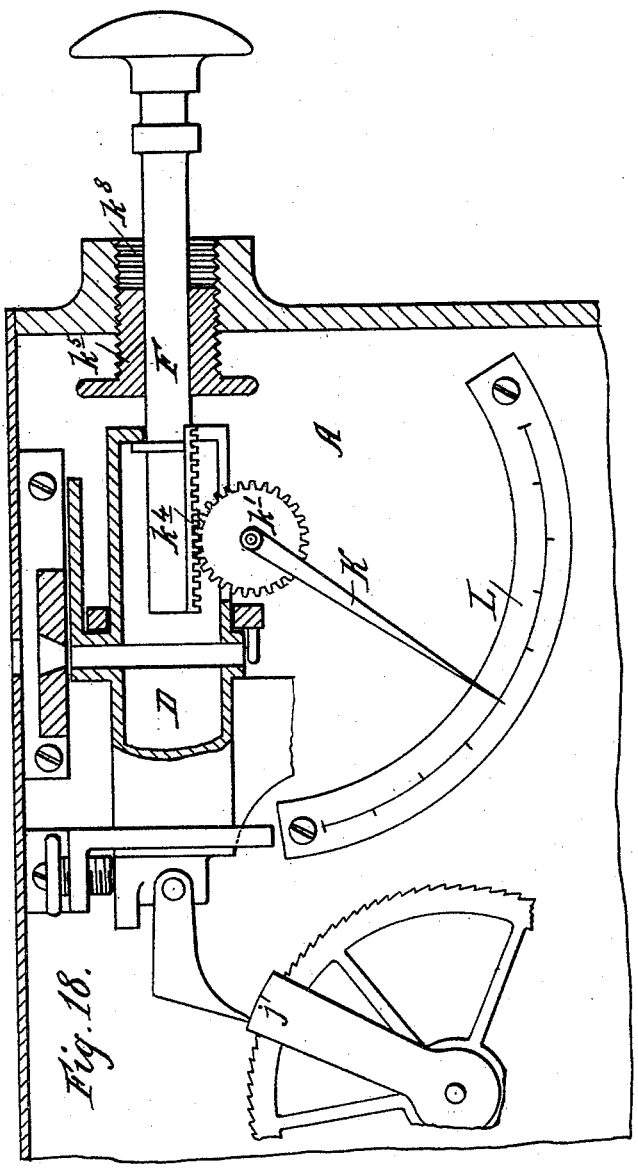
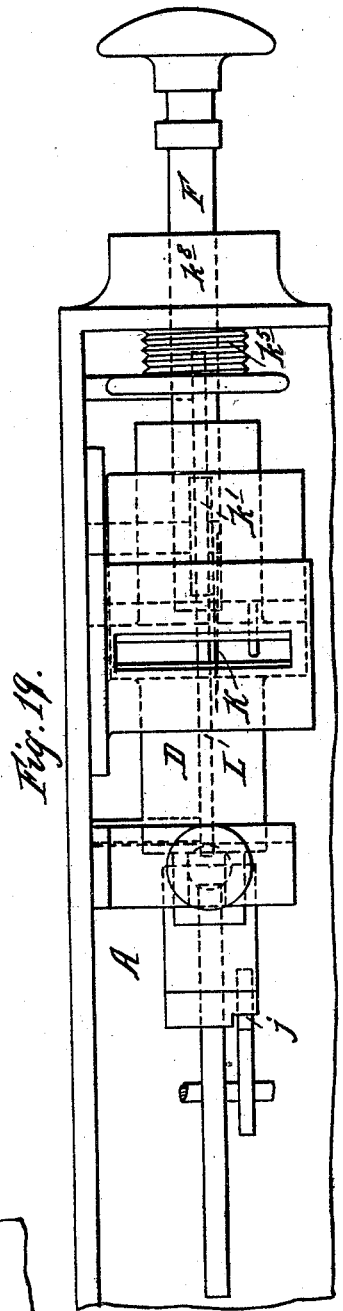
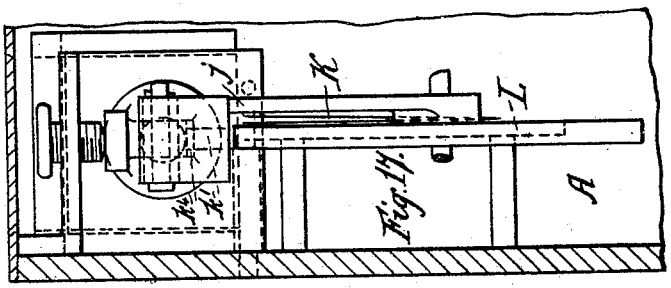
Witnesses: Inventor:

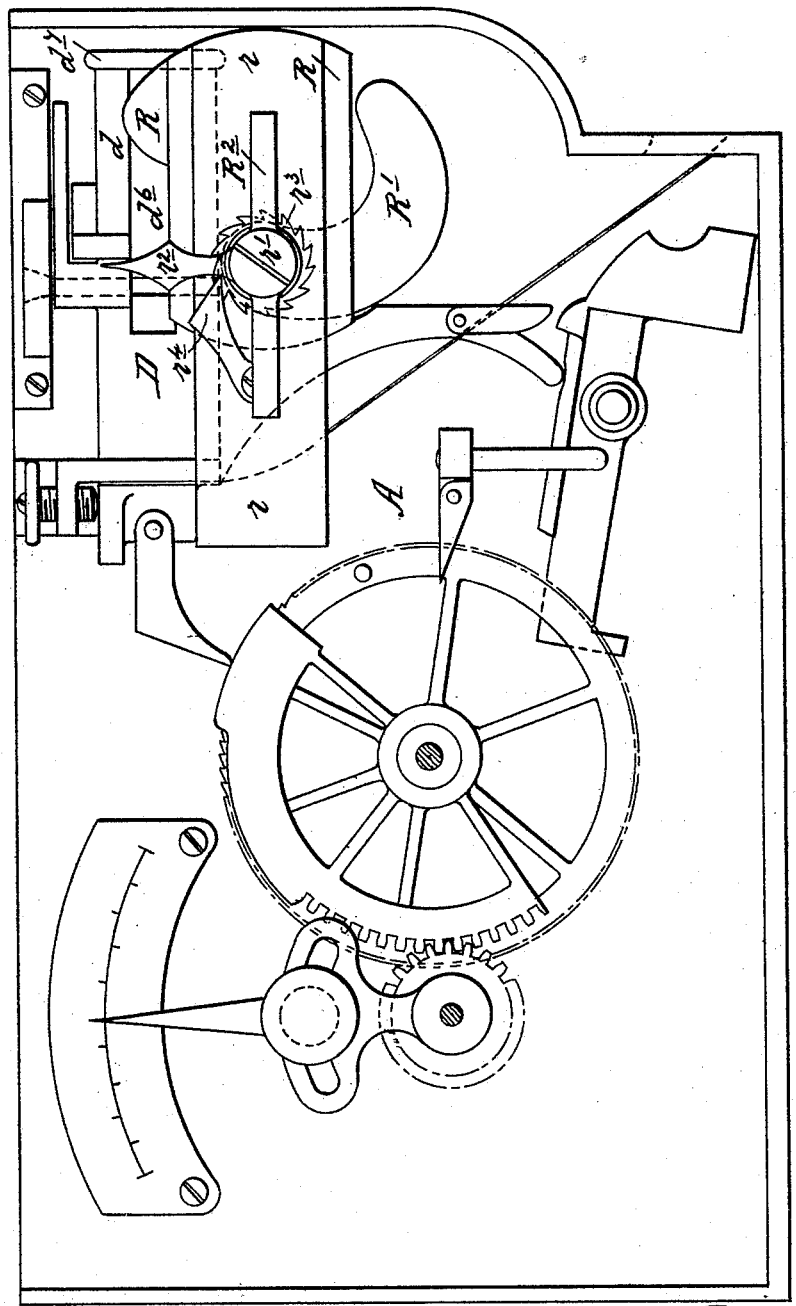

(No Model.)  12 Sheets—Sheet 7.

W. COWAN.
COIN FREED GAS METER.

No. 474,219. Patented May 3, 1892.

Witnesses:

Inventor:
William Cowan (No Model.) 12 Sheets—Sheet 8.

W. COWAN.
COIN FREED GAS METER.

No. 474,219. Patented May 3, 1892.

Witnesses:
Inventor:

(No Model.)  W. COWAN.  12 Sheets—Sheet 9.
COIN FREED GAS METER.
No. 474,219.  Patented May 3, 1892.
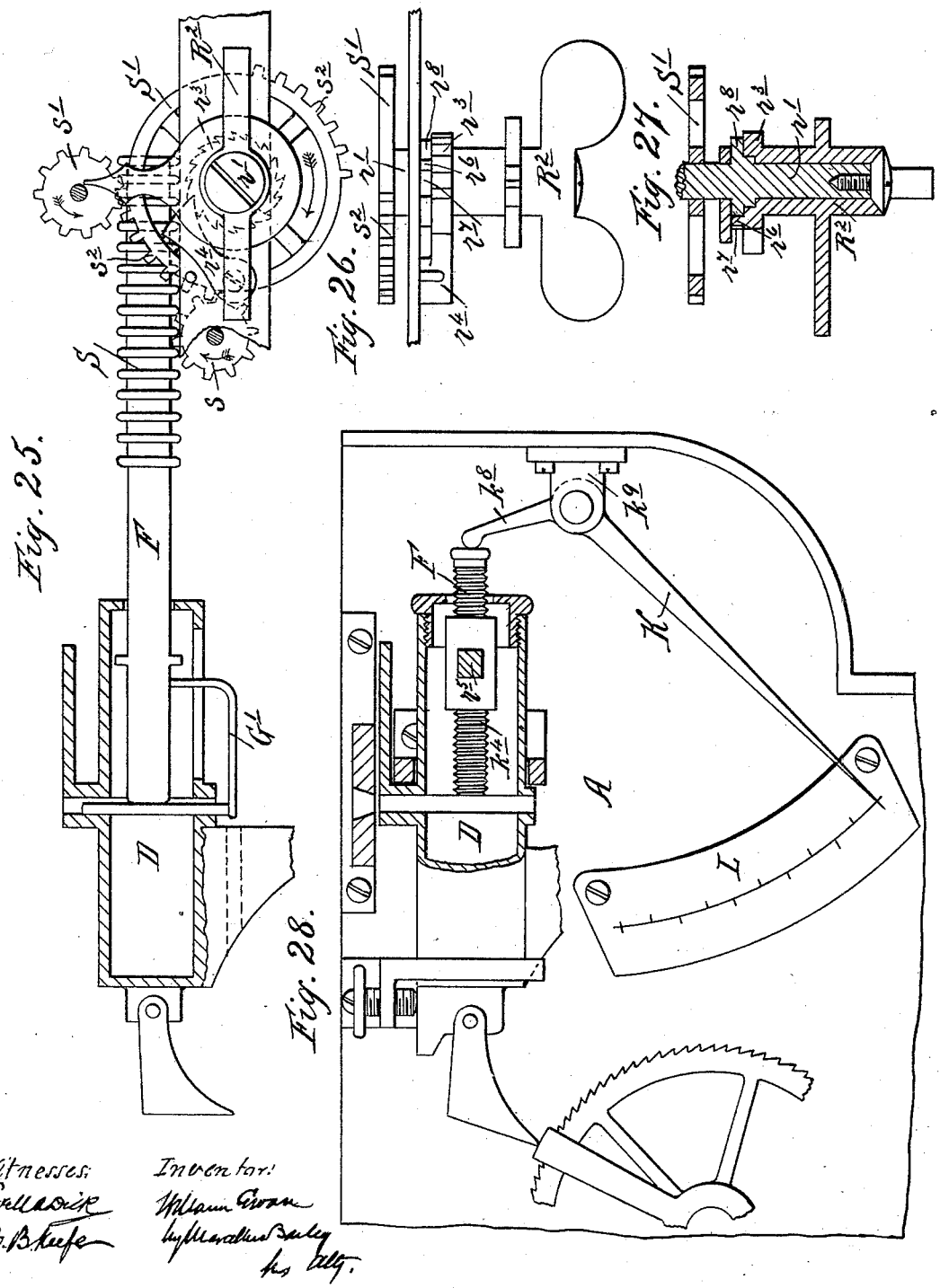

(No Model.) 12 Sheets—Sheet 10.
W. COWAN.
COIN FREED GAS METER.
No. 474,219. Patented May 3, 1892.
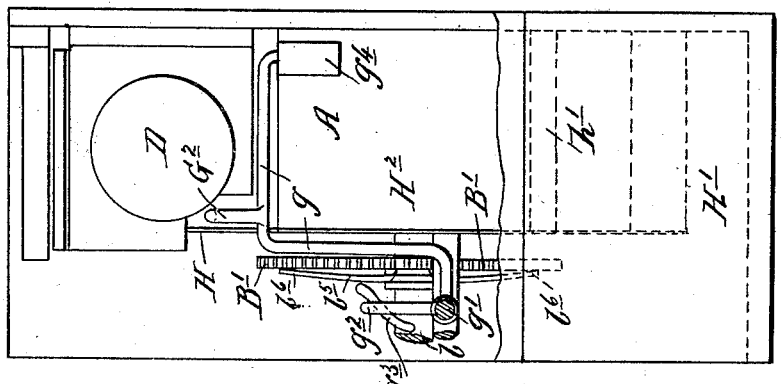
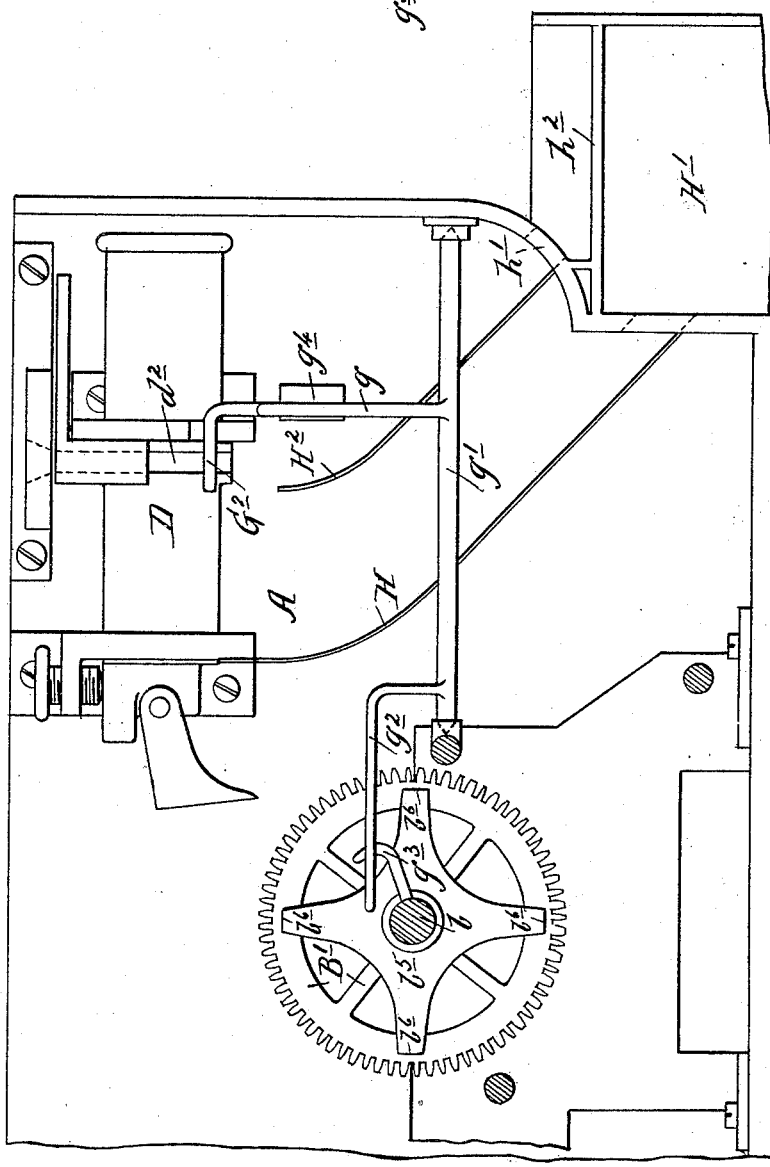

(No Model.) 12 Sheets—Sheet 11.
W. COWAN.
COIN FREED GAS METER.
No. 474,219. Patented May 3, 1892.
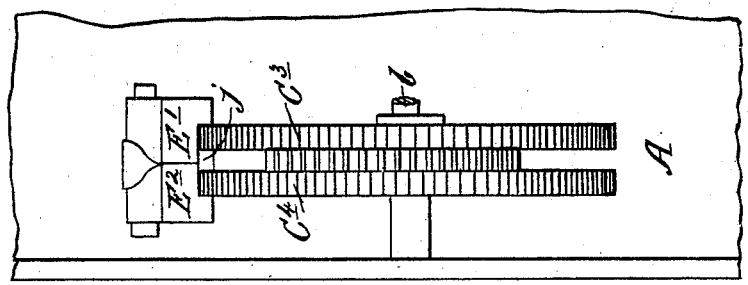
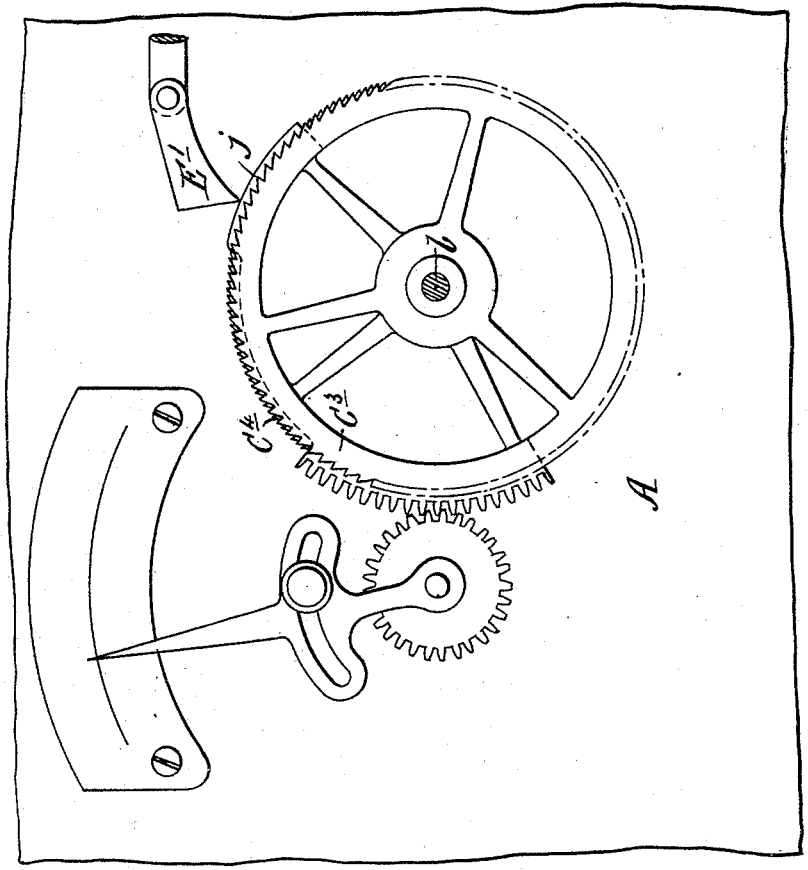

(No Model.)  12 Sheets—Sheet 12.

W. COWAN.
COIN FREED GAS METER.

No. 474,219. Patented May 3, 1892.

UNITED STATES PATENT OFFICE.

WILLIAM COWAN, OF EDINBURGH, SCOTLAND.

COIN-FREED GAS-METER.

SPECIFICATION forming part of Letters Patent No. 474,219, dated May 3, 1892.

Application filed January 8, 1892. Serial No. 417,375. (No model.) Patented in England July 23, 1890, No. 11,537; February 27, 1891, No. 3,575; May 16, 1891, No. 8,444, and October 22, 1891, No. 18,141.

*To all whom it may concern:*

Be it known that I, WILLIAM COWAN, gas-meter manufacturer, of Buccleuch Street Works, Edinburgh, in the county of Mid-Lothian, Scotland, have invented Improvements in Prepayment Coin-Freed Gas-Meters and in part applicable to Non-Prepayment Gas-Meters, (for which I have obtained Letters Patent in Great Britain, dated July 23, 1890, No. 11,537; February 27, 1891, No. 3,575; May 16, 1891, No. 8,444, and October 22, 1891, No. 18,141, of which the following is a specification.

This invention, which relates to improvements in prepayment coin-freed gas-meters and in part applicable to non-prepayment gas-meters, has for its object to provide means whereby the gas consumer may obtain a supply of gas and from time to time such further supplies as he may require, on his depositing in the money-slot of the said meter one or more coins equal in value to the supply of gas he thus pays for; and my said invention is applicable to both wet and dry gas-meters.

Figure 21:
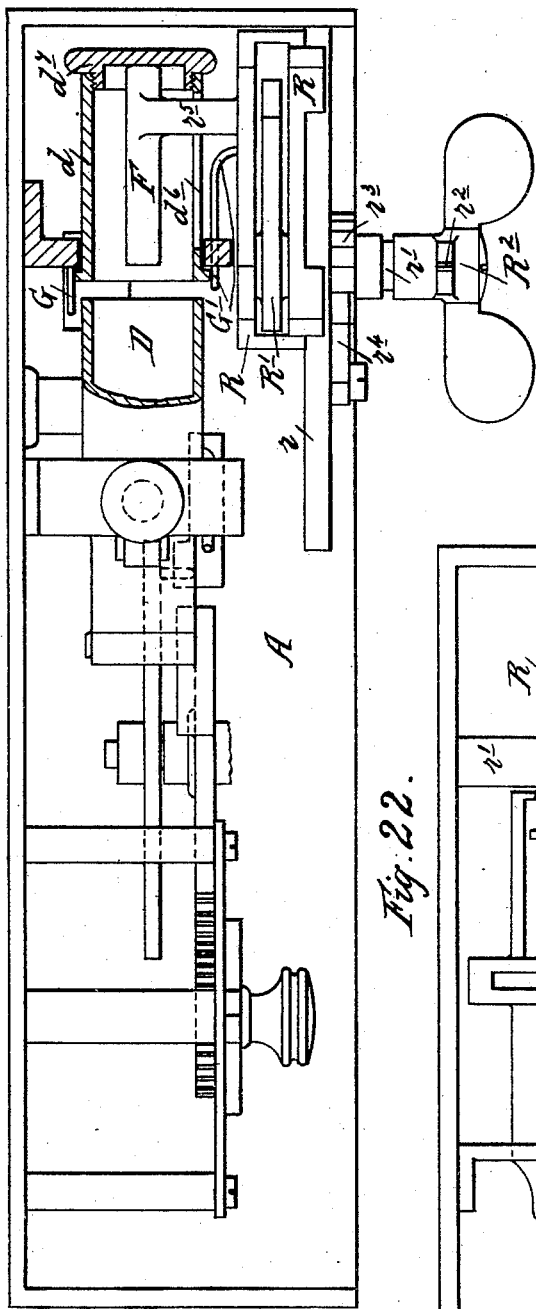
Figure 22:
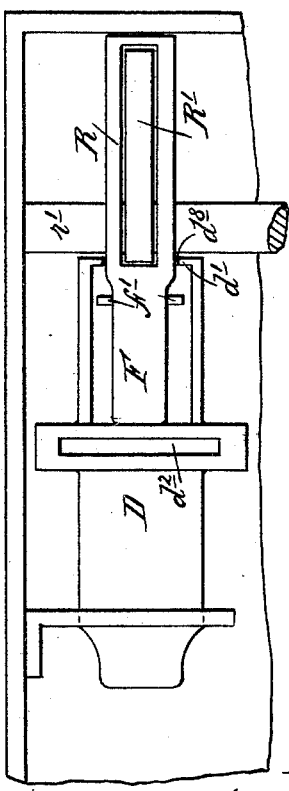
Figure 23:
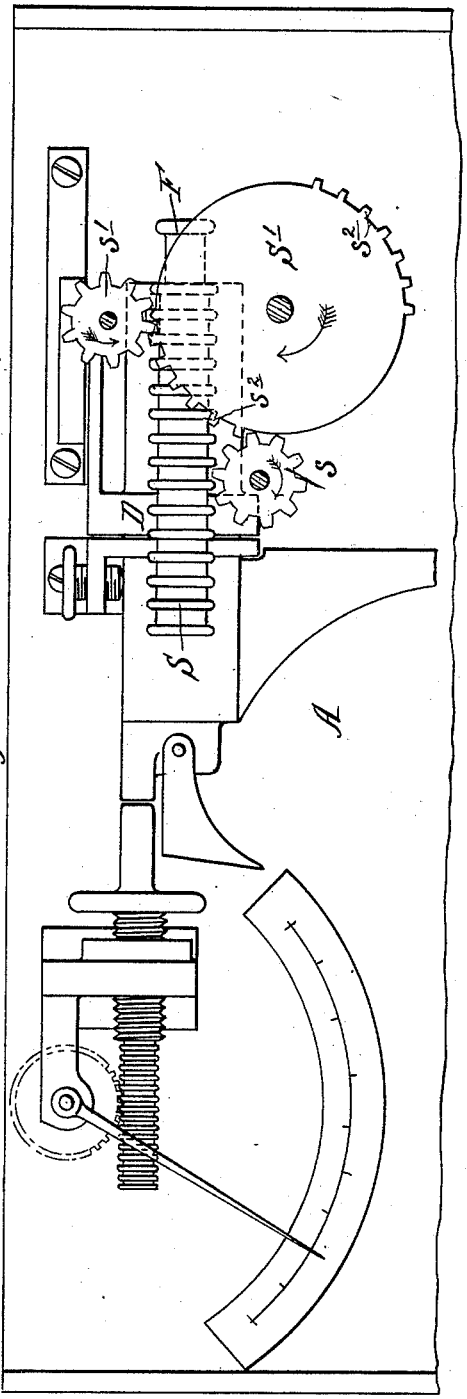
Figure 24:
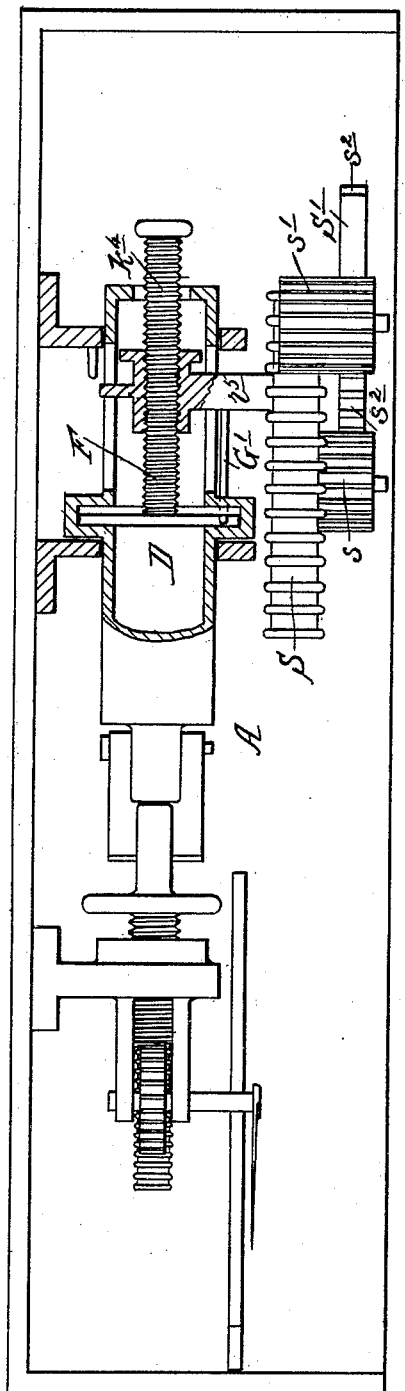
Figure 33:
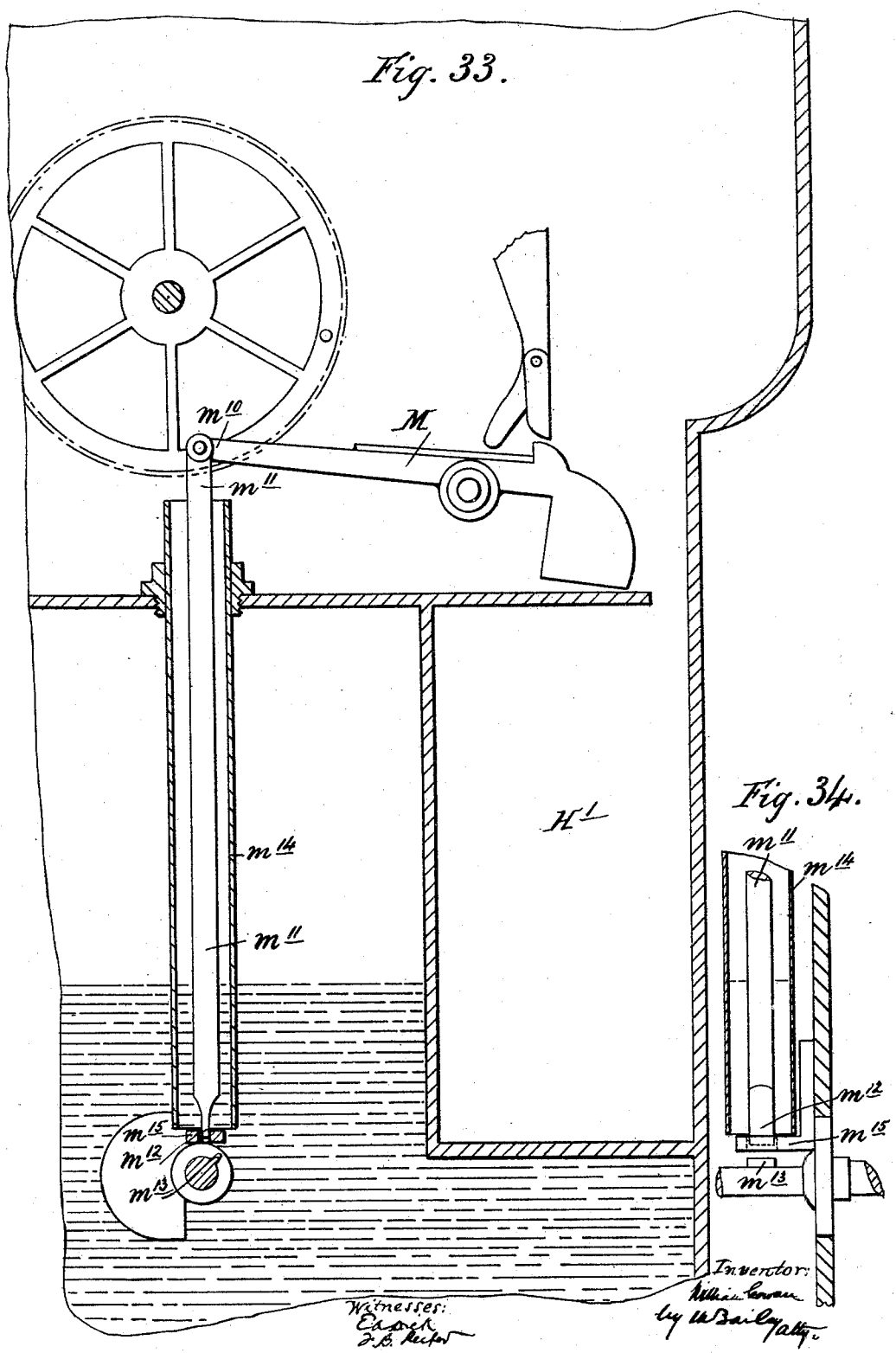
Figure 34:
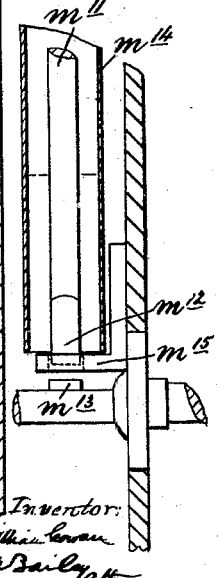

Referring to the drawings, Figure 1 is a side elevation, partly in section, of one form of apparatus constructed and arranged in accordance with my invention. Fig. 2 is a plan view, partly in section, of the same. Fig. 3 is a front elevation of the prepayment-index. Fig. 4 is a central vertical cross-section of the same. Fig. 5 is a detail view of one form of coin-chute and pusher. Fig. 6 is a view of a modified form of pusher and price-changing apparatus. Fig. 7 is a view of a modified form of coin-chute. Fig. 8 is a view showing a modified form of stop mechanism. Fig. 9 is a cross-section taken through the casing N, Fig. 8. Figs. 10 to 13 represent detail views of a guard to prevent the withdrawal of coins. Figs. 14, 15, and 16 represent modifications of the same. Figs. 17, 18, and 19, respectively, are an end elevation, sectional elevation, and plan view of a modified form of price-changing mechanism. Figs. 20 and 21 represent, respectively, a side elevation and plan view of a modification for preventing the pusher from being worked backward and forward to obtain a supply of gas without the insertion of a coin. Fig. 22 is a detail view showing a modified form of eccentric-box R, shown in Figs. 20 and 21. Figs. 23 and 24 are respectively a side elevation and plan view, partly in section, of a modified form of pusher and price-changing mechanism. Figs. 25, 26, and 27 are detail views of a still further modification of pusher. Fig. 28 is a detail view of a modified form of price-changing apparatus. Figs. 29 and 30 represent a front and end elevation showing mechanism for throwing out surplus coins. Figs. 31 and 32 are a front and end elevation, respectively, of a modified form of prepayment-wheel; Figs. 33 and 34, sectional views of a modified form of stop mechanism.

Referring to Figs. 1 and 2, which represent in elevation, partly in section and plan, my invention as applied to a dry meter, though it is equally applicable to a wet meter, I provide within the index box or inclosure A an index B, (shown in elevation and cross-section, Figs. 3 and 4,) and which is provided with a cross-shaft $b$, to which is keyed or otherwise secured a prepayment-wheel C, having fine ratchet-teeth $c$ around its periphery. The said shaft $b$ and prepayment-wheel C are geared to the index B by means of the gear-wheel B′, which is mounted on the said shaft $b$ in such a manner that it is only kept tight on the same with sufficient "grip" as to enable the index B driving the shaft $b$, which is at the same time left free to be itself turned by means of the prepayment-wheel C without interfering with the gearing-wheel B′ and index B when desired to set the prepayment-pointer C′. The said pointer C′ is provided at the end of said shaft $b$ in front of the dial C², which is provided with a special prepayment-circle $c'$, and the testing-circle $c^2$ is removed to the one side, as shown, and suitably geared from the leading wheel B′ of said index B. The said index B in all cases derives its motion by worm or other gearing from the driving-shaft in dry meters and the main-cylinder shaft in wet meters. In order to give the gearing-wheel B′ sufficient grip on the shaft $b$, I provide or form the said shaft, as shown more particularly in Fig. 4, with a ground tapered plug or key $b^2$, over which the said gearing-wheel B′ is placed, its boss $b^3$ being provided with a corresponding tapered hole or barrel and the two sufficiently bound together by a nut or nuts $b^4$, which are screwed onto the said shaft $b$; or I may form the plug or key on the outside of said wheel's boss and the tapered hole or barrel on the one end of said shaft or on the boss of the prepayment-wheel, in either of which cases they would be bound together by a nut or nuts.

In order to give the necessary movement to the prepayment-wheel C and pointer C' by means of a predetermined coin, I provide and mount near the top of the index-box A a movable slot-piece D, which has tubular extensions $d$ or rods on each side, and to the front one of which a pawl E is pivoted or hinged in such a manner as to push the prepayment mechanism partly round when the slot-piece D and pawl E are advanced by means of a coin and the pusher F. The one end of said pusher F extends outside the box A and is provided with a knob or handle $f$. The object of the extensions $d$ on the slot-piece D is for enabling the pusher F to have a free travel when no coin is present, and so prevent it from operating the mechanism, which can only be done by the pusher F pressing on an inserted coin, which thus forces forward the slot-piece D and pawl E, which are then withdrawn by the pusher F through the medium of the pins, flanges, or projections $f'$ $d'$. The said slot-piece D is provided with a coin-slot $d^2$, which may be at right angles to its center line, so as to enable the pusher F acting on the center, or nearly so, of the coin; or it may be in line with it, as shown in section, Fig. 5, in which case the pusher F will act upon the edge of the coin, the slot-piece D for which in most cases does not require a front extension, as the length of the slot is generally sufficient to permit of the pusher's free travel therein when no coin is present. The said slot-piece D, which is capable of a forward and backward movement, is suitably guided in brackets $a$, secured to the back of index-box A and provided with one or more friction-screws $a'$. The slot-piece D is so placed that when in its normal position, as shown, its inlet end is immediately under a corresponding slot-opening $d^3$, formed in a fixed guard-plate D', whose opening $d^3$ is immediately under the usual opening or slot $a^2$ in the cover of the index-box, the said guard-plate D' being for the purpose of preventing the coin from being surreptitiously withdrawn after the pusher F has been operated, this being assisted by the tail piece or plate $d^4$, formed on the said slot-piece D. The whole of the said slots are so arranged that on a coin being passed through the outer one $a^2$ it then passes through slot $d^3$ into the main slot $d^2$, in which it is retained until the pusher has by pressing against the coin given it the necessary support by a fixed rest or pin G, mounted directly over the entrance to the money-box chute H in such a manner as to cover enough of the outlet end of the slot $d^2$, and so prevent the escape of a proper coin, while a coin of smaller size will not be retained but will fall down the chute H into the money-box H', which is preferably formed outside the meter, as shown, and provided with suitable sealing devices. When the pusher F is operated by being pressed forward or inward, its pressure against the coin is sufficient to maintain the said coin in position after the slot $d^2$ has been moved away from the supporting rest or pin G; but in the event of any attempt being made to withdraw the pusher F, and hence relax its pressure on the coin before the proper point has been reached, the coin will at once fall through the slot $d^2$ and down the chute H into the money-box H'. When, however, the pusher F has moved the coin-slot piece D and pawl E the slightest distance beyond the fixed rest or pin G and is then withdrawn ever so little, the pressure upon the coin is then relaxed and the coin then falls into the money-box H' and is no longer available for giving power to the pusher F. The said arrangement thus prevents the fraud which is known as "pumping," and which consists of moving the pusher slightly backward and forward, and so engaging and disengaging the pawl E into the prepayment-wheel C, which by this operation would enable the consumer to obtain more gas than that of the value of the coin inserted.

It may sometimes happen, either accidentally or intentionally, that a coin coated over with fatty or other adhesive material may be passed into the slot $d^2$ of the slot-piece D and be retained there by adhesion between it and the surface of the slot $d^2$, with which it is intact. In order to prevent such an occurrence and a fraudulent use of such a possibility, the slot $d^2$ of the slot-piece D may be formed as shown in sectional elevation and plan, Figs. 6 and 7—that is, it may be provided with two or more ribs $d^5$ or series of pins, so as to reduce the contact between the coin and the slot $d^2$ to the least possible amount of touching surfaces as shown.

In order to meet the possibility of a change in the price of gas, I provide a price varying or changing arrangement within the index-box A, accessible to the gas official only. The said price-changing arrangement may be as shown in Figs. 1 and 2—that is, I mount loosely on the prepayment-shaft $b$ a segment of a wheel or quadrant J, having a raised portion or platform $j$ and segment of spur-teeth $j'$, the said platform $j$ being for the purpose of supporting the lower edge of the pawl E out of gear with the teeth $c$ of the prepayment-wheel C when in its normal position, as shown, as also during a part of the said pawl's travel, the exact distance of said part of travel being regulated at will by means of a pivoted pointer K and scale L. The said pointer K is mounted on a cross-shaft or spindle $k$ and geared by means of the spur-pinion $k'$ with the segment of spur-teeth $j'$ of the quadrant J, and the said pointer K is also provided with an arc-shaped slot $k^2$, in which a binding-screw $k^3$ works, so as to permit of the pointer K being set to any desired number on the graduated scale L, and so regulate the amount of the prepayment-wheel's teeth which will be acted upon by the pawl E, and so determine the exact movement of the prepayment mechanism, and by so doing limit the flow of gas to the quantity corresponding with the value of the coin inserted.

In order to stop the mechanism of the meter and so shut off the supply of gas when the supply paid for has been consumed, I provide a "compound-stop" arrangement, which answers the double purpose of bringing the mechanism of the meter to a stand (and so shutting off the supply of gas) if the pusher F and slot-piece D be not returned to their normal positions, as well as when the quantity of gas paid for has been supplied. The said compound-stop arrangement consists in forming on or attaching to the lower side of the slot-piece D a lower arm or tail-piece $D^2$, which is provided near its lower end with an auxiliary pivoted arm or tail-piece $D^3$, both of which have their lower ends working on a track $m$, suitably shaped and provided on the top side of the pivoted lever M, which has its one end $m'$ weighted and its other end $m^2$ bent in such a manner as to engage with the ratchet of the stop-valve of the dry meter. The object of the said tail-piece $D^3$ is to force down the weighted end $m'$ of the pivoted lever M in the event of the weight being inadequate to take the stop end $m^2$ out of the position in which it obstructs the progress of the ratchet of the stop-valve or other part of the meter's mechanism. The said tail-piece $D^3$ only yields in one direction—that is, when it is going inward with the pusher F—but it is rigid on the backward journey, when it meets with a rib or wall $m^3$ on the upper surface of the pivoted lever M, against which it presses and forces the said lever down, and so removes the stop. The said pivoted lever M is also provided with a bent upright rod or bracket $m^4$, which has mounted at its top end a one-way-yielding arm or projection $M'$, and against which a stop or projection $c'$ on the side or other part of the prepayment-wheel C works, and so causes the bent end $m^2$ of the pivoted lever M to fall into the track of the ratchet of the stop-valve, and thereby shut off the supply of gas, thus forming a compound-stop arrangement which answers the double purpose of bringing the meter's mechanism to a stand if the pusher and slot-piece be not returned to their normal position and also when the quantity of gas paid for has been supplied. When applying the said double-stop arrangement in a wet meter, I form the pivot of the pivoted lever as a cross-shaft $m^5$, as shown in Figs. 8 and 9. The said shaft $m^5$ passes through the back of the index-box A, where it is provided with a gas-tight joint N, as shown more particularly in section, Fig. 9, and which is a double-stuffing-box joint—that is, I screw or otherwise fix a stuffing-box $n$ into the wall of the index-box A, and outside the said wall I screw a solid end of a tube $n'$ into this box. The said tube $n'$ is provided near its center with a chamber $n^2$ for holding fatty or waxy material not liable to liquefy at moderate temperatures, and which may be put through the chamber's opening by unscrewing its cover $n^3$. The other end of this tube $n'$ is provided with another stuffing-box $n^4$, into which a solid cap or cover $n^5$ is screwed, thus forming a gas-tight joint which has two stuffing-boxes with an air-tight chamber between them and which may be filled with fatty or waxy material, so as to assist in preventing any escape of gas. The said cross-shaft or extended pivot $m^5$ has attached to it outside the box A a lever $m^6$, having a bent end or tail-piece $m^7$, which takes the place of the bent end $m^2$ of the lever M when applied to dry gas-meters. The said end $m^7$ is caused to pass through a hole or opening in the upper part of the meter-case, and so caused to engage, when necessary, with a stop or projection $m^8$, formed on or attached to the periphery or other part of the measuring-drum of the meter and which acts after the manner of the dry-meter stop. The said parts outside the case are all inclosed within a suitable gas-tight chamber or cover $m^9$, which is attached to the meter's case, the whole of the foregoing arrangements thus forming a prepaid coin-freed gas-meter which may be either a wet or dry gas-meter and which on the consumer putting in a coin in the slot and actuating the external push-knob or handle gas will be allowed to pass through the meter to the value of the coin inserted, or if more than one coin be inserted gas will pass through to the value of same.

This invention also relates in part to non-prepayment gas-meters—that is, the double-stuffing-box gas-tight joint N shown in Figs. 8 and 9 may be applied to non-prepayment gas-meters. In dry meters, for example, it may be used to enable the separate inclosure for the valves to be dispensed with by boxing in the index instead of the valves and superseding the usual vertical stuffing-box on the valve-crank by a horizontal double stuffing-box on the driving-shaft where it enters the index-inclosure. When hitherto such an arrangement has been attempted, the result has been unsatisfactory, because ordinary stuffing-boxes in the horizontal position are very liable to leak. The double stuffing-box, however, is free from this objection and may in the circumstances described be employed with advantage. With regard to the application of double stuffing-boxes to wet meters it will be found advantageous to employ them in most of those cases in which it has been usual to have single stuffing-boxes in the horizontal position.

My said invention also relates to the addition of a turnstile P, as shown in Figs. 10 to 13, inclusive, which is mounted outside the slotted disk of the index-box roof in such a manner as to prevent a coin with a string attached to it being maintained in position for fraudulent purposes. The said turnstile P consists of a circular slot $p$ large enough to accommodate the coin loosely and having an opening $p'$ in its edge, through which the coin is passed. This slotted disk $p$ is capable of being revolved by means of its handle $p^2$ some distance within the outer case $p^3$, which has two openings, one $p^4$ being in its front edge and the other $p^5$ in its sole-plate and which covers the index-box slot. In the normal position the revolving slotted disk $p$ has its opening $p'$ opposite the opening $p^4$, as shown; but when the coin has been inserted the circular slotted disk $p$ is moved round by the handle $p^2$ till its opening $p'$ corresponds with the opening $p^5$, and so allows the coin to fall into the slot of the prepayment mechanism. In some cases the said turnstile P may be provided with a square or other pusher P', Fig. 13, so as to enable bent or other unsuitable coins being ejected therefrom when desired, and which may be attached to the stile or index-box by means of a cord or chain $p^6$; or, as is shown in section, Fig. 14, the turnstile P may be formd with its movable slotted guard $p$ as a hinged or centered slotted guard, so that on a coin being put in the same when in its normal position, as shown by dotted lines, it would then be pressed by the fingers into the position shown and so allow the coin to drop through the outer casing's opening $p^5$ into the slot of the prepayment mechanism; or, as is shown in section, Figs. 15 and 16, I may form the turnstile P with a movable square slotted guard $p$, which is capable of being moved through a quarter of a circle within its casing $p^3$ by means of its handle, which may be fixed on the outer end of the slot's pivot $p^7$ or guide-pin $p^8$, so that on a coin being placed in same through the opening $p^4$, as in Fig. 15, and the handle turned it carries the slotted guard $p$ and coin down the inclined ridge $p^9$ till it reaches the opening $p^5$, when the coin falls into the slot of the prepayment mechanism. In this latter case the turnstile P is provided with an extra opening $p^{10}$ at its other side, so as to enable unsuitable coins being ejected, this opening $p^{10}$ being obstructed by means of a drop shutter or pin $p^{11}$ when the slotted guard $p$ is not in its normal position, as shown in Fig. 16.

It is desirable in some cases to modify the force which might be exerted on the pusher F by means of a spiral-screw arrangement Q, as shown in Fig. 6, through which the pusher F is made to pass. The said modification consists of a tube $q$, having a spiral groove $q'$, and which is connected to and revolved by the outside handle $f$, so as to cause the pusher F being moved along by means of the pin $q^2$, working in said groove $q'$. As thus constructed the pusher-rod F is adapted to slide in the spirally-grooved tube Q and is provided with a pin $q^2$, which projects through the spiral groove $q'$. As the tube Q is rotated by means of the handle $f$ the sides of the spiral groove $q'$ bear against the pin $q^2$ and force said pin, together with the pusher-rod, forward against the coin, in which case the pusher F does not revolve and has therefore no circular movement against the coin; but, if desired, the rod or pusher F may revolve and the tube $q$ be fixed, in which the case the pusher's end would be tipped by a pivoted end, which would remain steady while the pusher-rod revolves.

Fig. 6 also shows a modification of the price-changing arrangement, in which the pointer K and scale L are mounted in front of the slot-piece D and actuated by means of the spur-pinion $k'$, which gears into a rack $k^4$, formed on the end of an adjusting-screw $k^5$, which works in a suitable bracket $k^6$, fixed to the back of the index-box A. The front end of said screw $k^5$ is formed with a milled head and projecting point $k^7$, which on being screwed in toward the slot-piece D or away from it regulates the distance the slot-piece D, pawl E, and prepayment mechanism travel, as the pawl's platform $j$ is in this case a stationary platform, it being fixed in position by any suitable means, such as attaching it to the index-framing by a tie-rod or otherwise.

As shown in part end elevation, part sectional elevation, and part plan, Figs. 17, 18, and 19, I may further modify my price-changing arrangement—that is, I form my adjusting-screw $k^5$ as an external screwed nut, and I screw it into or out of an internal screwed boss $k^8$, formed in the wall of the index-box A, and which on being operated by the gas official determines the distance the pusher F will travel, and so therefore the prepayment mechanism, the exact distance to be traveled being obtained by means of the scale L and pointer K, which in this instance is geared by means of the spur-pinion $k'$ with a rack $k^4$, formed on the lower side and near the front end of the pusher F and which work in combination with a stationary platform $j$, as before.

Another mode of preventing the fraud known as "pumping" is shown in elevation and part sectional plan, Figs. 20 and 21, in which I employ an eccentrically-actuated pusher F—that is, I mount alongside the slot-piece D an eccentric box or track R, which works longitudinally in one or more guides $r$. Inside this box or track I mount an eccentric or cam shaped lever R', which is secured to the cross shaft $r'$, carried by the guides or brackets $r$, and provided with a knob or handle R² at its outer end, as already described, though in this case the said handle is provided with a pointer or finger $r^2$, which indicates the normal position of the internal parts on a small scale provided on the outside of the index-box cover, and it is also provided with a ratchet $r^3$ and pawl $r^4$, so as to insure of the handle and connecting parts being always turned in the one direction. The said eccentric box or track R has a projecting stud $r^5$ formed on or attached to the side which is next to the slot-piece D, which is provided with a longitudinal slot $d^6$ in its extension $d$, so as to enable the said stud $r^5$ to work in and so cause the pusher F, which is formed on or attached to the end of the stud $r^5$, to grip the coin and also to return the said parts to their normal position by the rear end of the pusher F coming against the closed end $d^7$ of the slot-piece's extension $d$. The said eccentric box or track R may also, if desired, be mounted as shown in part plan, Fig. 22—that is, in line with the slot-piece D, which may have its slot $d^2$ also formed in line with or at right angles to its center line. In this case the pusher F would be formed on or attached to the eccentric box or track R and the slot-piece $d$ would have an end opening $d^8$ in lieu of the longitudinal slot $d^6$, and the pusher F and slot-piece $d$ would also be provided with pins or projections $f'$ $d'$, as already described, so as to enable the pusher F both to operate through the medium of an inserted coin and also to return slot-piece and its connecting parts to their normal position.

My said invention further relates to means whereby the coin is prevented from dropping into the money-box before the pusher F has given the full amount of movement and therefore the proper amount of gas for the coin. I provide for this, as is shown in Fig. 21, a toe-piece or traveling rest G', which is fixed to and so moves with the eccentric box or track R, or it may be with the pusher F. The said rest G' thus forms a traveling rest, which supports the edge of the coin before it leaves the permanent rest G and until the coin has arrived at the proper place for its discharge, which is immediately effected by withdrawing the pusher F and so relaxing the pressure of same on the coin and at the same time and by the same action withdrawing the traveling rest G', thus allowing the coin to fall down the chute into the money-box; or as a modification of the said eccentric arrangement I may employ a reciprocating-rack arrangement, as shown in elevation and sectional plan, Figs. 23 and 24—that is, I mount a circular or other rack S alongside the slot-piece D, and I form the said rack S with the projecting stud $r^5$ at right angles to its center line, and which has the pusher F formed on or attached to its inner end. The said rack S may, if desired, be formed in one with or lie in line with the pusher F, as shown in Fig. 25. In either case the said rack S is reciprocated backward and forward by means of two spurred pinions $s$ and $s'$, which are mounted the one above and the other below the said rack S, so as to enable them being operated in their respective directions by means of a revolving disk S', having two segments of spur-teeth $s^2$, and which is operated or revolved by the consumer after the insertion of a coin in the slot through the medium of a suitable handle, as heretofore. The whole of the said parts are suitably mounted and carried by brackets or otherwise within the index-box A. In this modification I form or provide the handle $R^2$ with a device whereby the fraud known as "pumping" is prevented, as shown in elevation, plan, and cross-section, Figs. 25, 26, and 27—that is, I form or fix to the said handle $R^2$ a circular ratchet-wheel $r^3$, into which a pivoted pawl $r^4$ works. The said handle $R^2$ is mounted loosely on the axle $r'$ of the revolving disk S', and is provided with a pin or projection $r^6$, which works in a check or recess $r^7$, formed in a collar $r^8$ on the said axle $r'$, the object of the foregoing being to allow the handle $R^2$ a little play, so as to enable the pawl $r^4$ to act quicker, and so prevent the handle $R^2$ being moved alternately backward and forward. The said Figs. 23 and 24 also show a further modification of my price-changing arrangement, in which I form the pusher F itself as the adjusting-screw $k^4$ and screw it into or out of the projecting stud $r^5$ of the reciprocating rack S, which now forms a carrier for same, as also the projecting stud $r^5$ or carrier of the eccentric box or track when used with such, and as shown in Fig. 28, in either of which cases the register or pointer and scale device shown in Figs. 6, 23, and 24, and already described would be employed for setting purposes; or in connection with the foregoing I may employ the modification of the pointer and scale arrangement as shown in Fig. 28—that is, I form the said pointer K with a tail-piece $k^8$, and I pivot it in a small bracket $k^9$. The said tail-piece bears upon the end of the screwed pusher F, and so causes the pointer K to indicate on the scale L, according to the position of the pusher F.

My said invention also relates to an improved double-chute arrangement, as illustrated in part elevation and end elevation, Figs. 29 and 30, whereby small coins and, if desired, surplus coins are returned to the consumer without operating any of the internal mechanism. In carrying out the same I provide an extra chute $H^2$, which is mounted inside the index-box A in such a manner and in such a position that when the slot $d^2$ is in its normal position, as shown, the coin, if present, does not stand directly over the entrance of the money-box chute H, but over the mouth or entrance of this extra chute $H^2$, which communicates with an opening $h'$ in the outside case of the meter or index-box A in such a manner that on placing a small coin in the slot $d^2$ it passes through same, down the chute $H^2$, and through the opening $h'$ onto a platform $h^2$, mounted or formed on the outside of meter's case or index-box, though preferably on the top of the money-box H', as shown, and from which it may be easily recovered. The said extra chute $H^2$ is also applicable for delivering back surplus coins—that is to say, coins which are inserted after the prepayment-pointer C' has reached a predetermined position on the prepayment dial or circle $c'$, Fig. 3, the said delivery of surplus coins being effected as shown in Figs. 29 and 30—that is, by forming the guard or rest which retains the proper coin in the slot $d^2$ as a movable or pivoted guard or rest $G^2$. Said rest $G^2$ is carried by the upper end of a rod $g$, which at its lower end is rigidly connected to a rock-shaft $g'$, mounted in suitable bearings. $g^2$ indicates a projecting arm rigidly affixed to said rock-shaft and adapted to be engaged by a cam $g^3$ on the prepayment-shaft of the index at the proper time to rock the shaft $g'$ and swing the guard or rest $G^2$ away from the slot $d^2$, and so allow the surplus coins to fall down the chute $H^2$ and onto the platform $h^2$ by means of a cam or projection $g^3$, formed on or attached to the prepayment-shaft $b$ of the index, the said parts being all retained in their proper or normal positions, as shown, by means of a counterpoise-weight $g^4$ until the predetermined quantity of coins has been inserted, when, owing to the movement given by the last coin inserted, the guard or rest $G^2$ has been removed and no more will act on the mechanism, but will simply pass out onto the platform $h^2$, and so be delivered to the consumer. When this arrangement of movable guard or rest $G^2$ is used, the one-way-yielding arm or projection M', Figs. 1 and 2, of the compound stop may be made rigid, and so dispense with the one-way-yielding joint. The said Figs. 29 and 30 also show a modification of giving necessary grip to the driving or gearing wheel B' of the prepayment mechanism, that is—in lieu of the ground-plug arrangement, as shown in Fig. 4, I provide a spring $b^5$, which is fixed on the shaft $b$, having sufficient spring in it to cause its ends $b^6$ to press against the wheel B', and so cause it to drive the shaft $b$ when the index moves, and also to allow a freedom whereby the prepayment pointer and shaft $b$ may be revolved without affecting the index.

As shown in elevation and end elevation, Figs. 31 and 32, I may modify the construction of my prepayment-wheel and pawl arrangement—that is, I form the said wheel as a double wheel or as two wheels $C^3$ and $C^4$, which I fix side by side upon the shaft $b$ in such a manner that the teeth of the one wheel are in a position between the teeth of the other wheel, as shown, and I also employ two pawls E' and $E^2$, which operate the said wheels $C^3$ and $C^4$, and by reason of the position of the one wheel's teeth with the teeth of the other I am enabled to form the teeth much coarser or to use only half the number of teeth upon each of the wheels than would be the case if all the teeth were on one wheel, and therefore by so doing the teeth may be formed as coarse as necessary for secure working, and so lessen the tendency to "miss" which might be experienced when very finely-cut teeth are employed. In a similar manner I may employ three or more wheels and pawls arranged side by side, if desired, to still further increase the size or coarseness of the teeth; and in some cases I may employ one pawl only for two or more wheels. The said wheels and pawls may be used with either a stationary or moving platform $j$.

As a modification of my compound-stop arrangement as applied to a wet meter and shown in Figs. 8 and 9 I may employ an arrangement as shown in Figs. 33 and 34—that is, I form a water seal in lieu of the double stuffing-box N—in which case the pivoted lever M is connected at its one end $m^{10}$, to a depending rod $m^{11}$, whose lower end $m^{12}$ comes in contact with a projection $m^{13}$ on the shaft of the main drum, as shown, when the pusher and its connections are not in their normal positions, as well as when the quantity of gas paid for has been consumed. The said depending rod $m^{11}$ is contained in a water-sealed tube $m^{14}$ and guided at its lower end by means of a small bracket $m^{15}$, as shown. The said Fig. 33 also shows a modification of the money-box H' which I prefer to use in wet meters—that is, I cast or otherwise form the said box within the meter's case at the right-hand top corner, as shown, and form the front of the case with a suitable locking or sealing door.

It is to be understood that each and all of the foregoing improvements, where not specifically mentioned, are applicable to both wet and dry prepayment coin-freed gas-meters; also, that the double-stuffing-box joint N, Figs. 8 and 9, is applicable to non-prepayment gas-meters as well as prepayment gas-meters.

I claim—

1. In a coin-controlled gas-meter, the combination of a wheel adapted to permit the passage of a predetermined quantity of gas through the meter at each revolution thereof, a reciprocating coin-receptacle carrying a pawl engaging said wheel to impart a uniform partial rotation to said wheel at each reciprocation thereof, a pawl, a pusher sliding in said coin-receptacle and adapted on insertion of a coin to actuate said receptacle and rotate the wheel to admit a predetermined quantity of gas through the meter, a movable index for regulating the rotation of the wheel by the said pawl, mechanism for automatically stopping the flow of gas through the meter, and a guard for preventing the withdrawal of a coin from the coin-receptacle, substantially as described.

2. The combination of the wheel C for controlling the passage of the gas through the meter, the reciprocating coin-receptacle D, provided with the transverse coin-slot $d^2$ and carrying at its end the pivoted pawl E, engaging the wheel C, the pusher F, sliding in the coin-receptacle, the adjustable index K, engaging the wheel C and adjustably regulating the rotation of said wheel by the said pawl, and the detent M for automatically stopping the meter, substantially as described.

3. The combination of the wheel C, the reciprocating coin-receptacle D, carrying the pawl E, engaging said wheel, the spirally-grooved tube Q, the sliding pusher-rod F, carrying the pin $q^2$, traveling in the spiral groove $q'$, and the adjustable index K, substantially as set forth.

In testimony whereof I have signed my name to this specification, in the presence of two subscribing witnesses.

WILLIAM COWAN.

Witnesses:
A. K. JOHNSTON,
DUNDAS PORTEOUS MCKINLAY,
*Draughtsman, 115 St. Vincent Street, Glasgow.*